(12) United States Patent
Smith et al.

(10) Patent No.: US 7,092,402 B1
(45) Date of Patent: Aug. 15, 2006

(54) ADAPTIVE DATA RATE LINK MECHANISM FOR HIGH FREQUENCY DATA COMMUNICATION

(75) Inventors: Paul A. Smith, Cedar Rapids, IA (US); Donald J. Barrett, Swisher, IA (US); Robert G. McFarland, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 801 days.

(21) Appl. No.: 09/851,473

(22) Filed: May 8, 2001

(51) Int. Cl.
*H04J 3/22* (2006.01)
(52) U.S. Cl. ..................... 370/437; 370/468
(58) Field of Classification Search ............... 370/328, 370/329, 332, 333, 338, 436, 437, 465
See application file for complete search history.

(56) References Cited

U.S. PATENT DOCUMENTS

| | | | | |
|---|---|---|---|---|
| 5,757,779 A | * | 5/1998 | Young et al. | 370/252 |
| 6,141,353 A | * | 10/2000 | Li | 370/465 |
| 6,646,998 B1 | * | 11/2003 | Rasanen | 370/328 |

OTHER PUBLICATIONS

Gillespie, A.F.R. et al "Performance characteristics of the STANAG 5066 HF data link protocol" 1999 Institution of Electrical Engineers, Mar. 29-30, 1999, pp. 8/1-8/6.*

Trinder, S.E. et al "Algorithms for the adaptation of data rate using STANAG 5066" 1999 Institution of Electrical Engineers, Mar. 29-30, 1999, pp. 9/1-9/6.*

Trinder, S.E. et al "An Adaptation of STANAG 5066 for automatic power control on HF links" HF Radio Systems and Techniques, IEEE 2000, Jul. 10-13, 2000, pp. 151-154.*

Fornes, J. "Proposal for an ALM Open Architecture" 1999 Institute of Electrical Engineers, Mar. 29-30, 1999, pp. 25/1-25/10.*

U.S. Department of Defense. *Department of Defense Interface Standard: Interoperability and Performance Standards for Medium and High Frequency Radio Systems (MIL-STD 188-141M)*. Entire document. Mar. 1999, Washington, D.C.

NATO C3 Agency. *NATO Standardization Agreement: Profile for High Frequency (HF) Radio Data Communications (STANAG 5066)*. Entire document. 1998 (version 1.2), The Hague.

\* cited by examiner

*Primary Examiner*—Chi Pham
*Assistant Examiner*—Anh-Vu Ly
(74) *Attorney, Agent, or Firm*—Nathan O. Jensen; Kyle Eppele

(57) ABSTRACT

A communication system can utilize a STANAG 5066 profile and include a data rate link mechanism. The data rate link mechanism can reside in a linking layer, such as, a subnetwork management sublayer according to the STANAG 5066 application. The mechanism allows data rate change functions of HF messages to increase throughput upon link establishment. Link quality can be determined by LQA signals generated according to MIL-STD-188-141B profiles.

20 Claims, 4 Drawing Sheets

ADAPTIVE DATA RATE LINK MECHANISM FOR HIGH FREQUENCY DATA COMMUNICATION

FIELD OF THE INVENTION

The present invention relates to high frequency data communication. More particularly, the present invention relates to linking mechanisms for high frequency communications.

BACKGROUND OF THE INVENTION

Communication systems generally include transmitters and receivers which must negotiate a data rate at which encoded data is transferred. The encoded data can be digital or analog data. Typically, the transmitter provides data at a first data rate and increases or decreases the data rate in response to errors associated with the communicated data. The receiver analyzes the received data according to a number of error detection schemes and requests that the data rate be increased or decreased depending upon the number of errors detected.

According to a conventional high frequency (HF) data communication system defined by Standard Agreement 5066 (STANAG 5066 V1.2), communication between the communication units begins at an initial or default data rate. The default data rate is defined in Paragraph C.6.4.1 of STANAG 5066. In addition, an initial or default interleaving level for STANAG 5066 systems is defined in Paragraph C.6.4.1. Paragraph C.6.4.1 of STANAG 5066 states:

All connections on which the data rate or other modem parameters can be controlled shall be initiated at 300 bits per second using short interleaving.

Therefore, communication systems operating according to STANAG 5066 utilize a relatively low initial data rate and a low throughput interleaving level. For example, a first communication unit operating according to STANAG 5066 provides data at a relatively low data rate (300 bits per second (BPS)) using short interleaving to establish a first leg of communication. The use of relatively low data rate with short interleaving ensures that initial communications are not error prone.

Using this relatively low data rate with short interleaving severely limits the amount of data which can be transferred upon the initial establishment of the link. Thereafter, increased data rates and other interleaving schemes can be negotiated based upon the quality of the channel between the first and second communication units. For example, if the initial communication leg is communicated without any errors, the data rate and the interleaving parameters can be increased to achieve a higher overall transfer rate of data according to paragraph C.1.4 of STANAG 5066. However, this technique requires additional time before information is communicated at its optimal rate.

Thus, there is a need for an initial adaptive data rate algorithm which does not rely on low initial data rate. Further, there is a need for an initial adaptive data rate algorithm which does not rely on a relatively short interleaving parameter. Further still, there is a need for increased throughput between communication units during initial communication.

SUMMARY OF THE INVENTION

An exemplary embodiment relates to a STANAG 5066 communication system. The communication system includes a first unit and a second unit. The first unit provides an LQA command to the second unit during initial linking. The second unit records a first LQA value in response to the LQA command and transmits the first LQA value to the first unit. The first unit records a second LQA value in response to the LQA value and transmits the second LQA value to the first unit. The first unit and the second unit communicate at a data rate selected in response to the first LQA value and the second LQA value.

Another exemplary embodiment relates to a STANAG 5066 communication unit. The communication unit includes a receiver and a transmitter and an initialization circuit. The initialization circuit determines a data rate for at least one of the receiver and the transmitter. The initialization circuit selects the data rate in response to a first LQA value received by receiver during link initiation.

Still another exemplary embodiment relates to a STANAG 5066 communication unit. The communication unit includes a transmitter, a receiver and an initialization means for selecting a data rate in response to an exchange of link quality values. The link quality values being derived from an initial waveform.

Still yet another exemplary embodiment relates to a method of setting a data rate for a STANAG 5066 communication link. The method includes receiving a quality command signal, recording a quality command value in response to the quality command signal, transmitting a quality command value signal related to the quality command value and receiving an acknowledgement of the quality command signal. The method further includes setting the data rate in response to the acknowledgement and the quality command value.

BRIEF DESCRIPTION OF THE DRAWINGS

The exemplary embodiments will hereafter be described with reference to the accompanying drawings, wherein like numerals denote like elements, and.

DETAILED DESCRIPTION OF THE PREFERRED EMBODIMENTS

Figure 1:
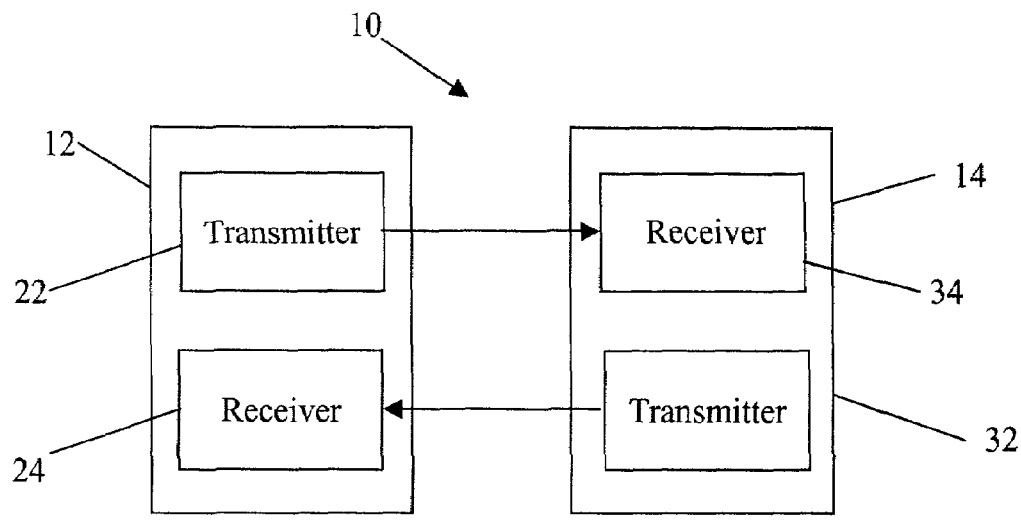
FIG. 1 is a block diagram of a communication system in accordance with an exemplary embodiment.

With reference to FIG. 1, a communication system 10 includes a first unit 12 and a second unit 14. Communication unit 12 includes a transmitter 22 and a receiver 24. Communication unit 14 includes a transmitter 32 and a receiver 34. Although communication system 10 is shown with two communication units 12 and 14, any number of communication units can be utilized. Principles of the present invention are applicable to any type of networking or other communication applications.

Communication system 10 can be a wireless wide area network (WAN) connected via HF links, a wireless local area network (LAN), or other sets of wireless communicating units. For example, system 10 can include any number of communication units and can even support three-way or more communication. In a preferred embodiment, system 10 is a wireless high frequency (HF) system. Data can be communicated according to the STANAG 5066 specification.

In operation, communication unit 12 is a master link unit and unit 14 is a slave link unit. Master link unit 12 initiates communication by providing a link quality command to unit 14 (e.g., a call phase). Unit 14 recognizes the link quality command and provides a link quality parameter to unit 12 (e.g., response phase). The link quality parameter indicates how well the unit 14 heard unit 12 (how well receiver 34 heard transmitter 22).

Unit 12 transmits an acknowledgement of value quality parameter (e.g., acknowledge phase). Units 12 and 14 communicate according to a data rate and interleaving parameter set in response to the link quality determinations made by units 12 and 14. For example, unit 12 can compare the quality measurements in accordance with minimum, maximum and default quality values which have been provided as initial parameters. In this way, units 12 and 14 are not required to initially communicate at a fixed data rate or a preset interleaving characteristic.

Figure 2:
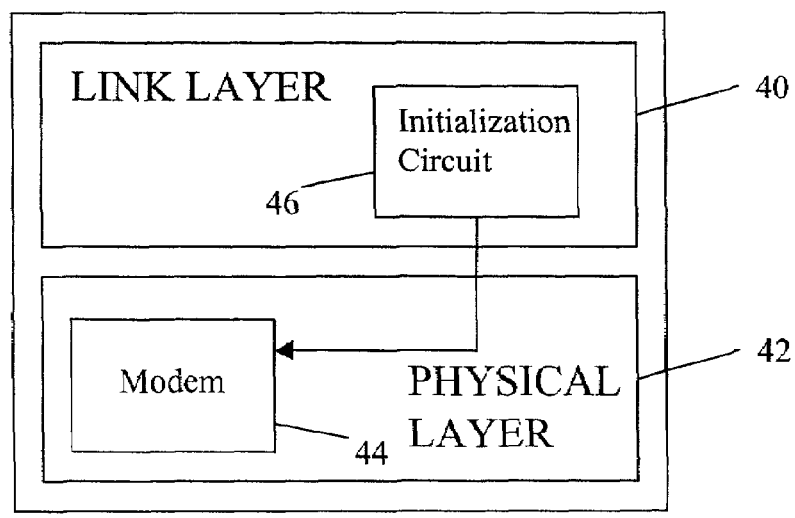
FIG. 2 is a more detailed schematic view of a communication unit for use the communication system illustrated in FIG. 1.

With reference to FIG. 2, unit 12 or 14 generally includes a link layer 40 and a physical layer 42. Physical layer 42 includes a modem unit 44 and link layer 40 includes an initialization circuit 46. Modem unit 44 receives data from an external source and modulates onto waveforms transmitted by layer 42.

Link layer 40 establishes a link or a connection between units 12 and 14 (FIG. 1) and physical layer 42 providing various radio frequency (RF) processing functions including modulating and demodulating (modem) functions.

Initialization circuit 46 is an automatic link establishment circuit or Adaptive Data Rate Link mechanism which sets a data rate and interleaving parameter for units 12 and 14 of system 10 in response to the determination of the quality of a link between units 12 and 14. The quality of link can be determined by using link quality analysis (LQA) data such as LQA data described in "Interoperability and Performance Standards for Medium and High Frequency Data Systems," (MIL-STD-188-141B). The LQA data can be generated internally and does not require an external data source.

System 10 can be an autobaud or a non-autobaud system. In an autobaud system, receiver 34 and receiver 24 are capable of recognizing the baud rate or data rate associated with the transmitted waveform. Accordingly, in the autobaud system, transmitter 22 selects the data rate for the link between transmitter 22 and 34 and transmitter 32 selects the data rate for the link between transmitter 32 and 24. In the autobaud system, units 12 and 14 independently select the initial data rate.

In the non-autobaud mode, receiver 34 must be given the appropriate data rate by transmitter 22. Accordingly, with such a system, transmitter 22 selects the data rate and provides an indication of the data rate in the acknowledge phase of the link. With such a system, the initial data rate is the same for the link between transmitter 22 and transciever 34 and for the link between transmitter 32 and receiver 24.

Figure 3:
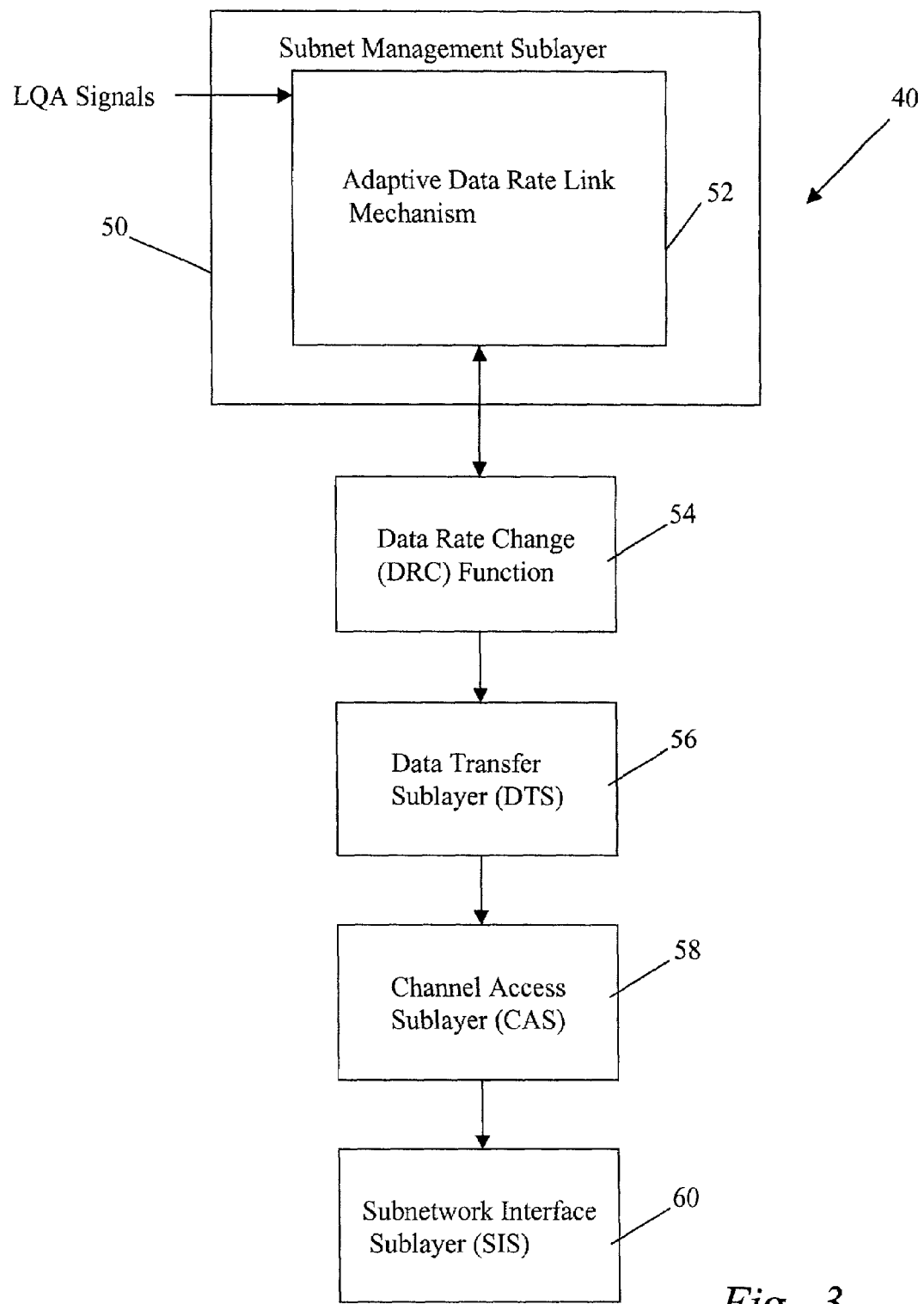
FIG. 3 is an even more detailed schematic view of the communication system illustrated in FIG. 2.

With reference to FIG. 3, link layer 40 includes a subnet manager sublayer 50 that includes an adaptive data rate link mechanism 52. Adaptive data rate link mechanism 52 generates and processes the link quality parameters to set a data rate through data rate change function 54, data transfer sublayer 56, channel access sublayer 58 and subnetwork interface sublayer 60. Generally, the functions of mechanism 52 can be achieved by a the hose processor programmed according to the operations described herein. The processor can utilize a look-up table to choose the data rate based upon the LQA values. For example, a minimum data rate, a maximum data rate, a default rate and data rates corresponding to ranges of LQA values can be stored in the look-up table.

Figure 4:
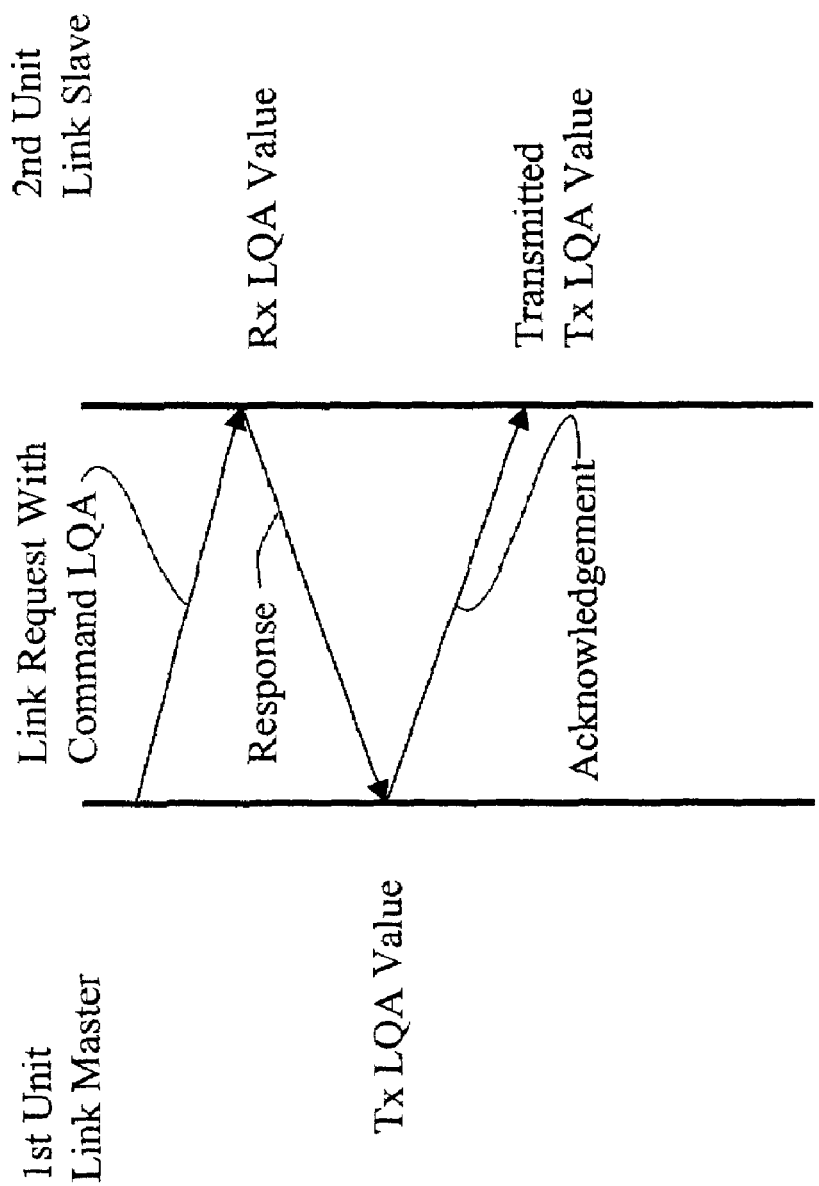
FIG. 4 is a schematic diagram of a linking operation for the system illustrated in FIG. 1, in accordance with another exemplary embodiment.

With reference to FIGS. 1, 3, and 4, the operation of system 10 is described below as follows. In FIG. 4, communication unit 12 (FIG. 1) as a link master unit and provides a link request including a command link quality analysis (LQA) signal. The command LQA signal can be provided in accordance with MIL-STD-188-141B. In one embodiment the LQA signal is a frequency shift keyed (FSK) signal. Communication unit 14 receives the command LQA signal and determines a RxLQA value indicating how well unit 14 received the link request from unit 12. As discussed in MIL-STD-188-141B, the LQA signal can include a 4 bit noise report, a 7 bit first character field, a 1 bit control field, a 3 bit MP field, a 5 bit SINAD bit field, and a 5 bit BER bit field. The specific format given is described in an exemplary fashion. The first character field can provide any number of CMD functions for system 10 including the command LQA function. The SINAD fields provide signal to noise and distortion measurement $((S+N+D)/(N+D))$ averaged over the duration of each signal. The MP field provides a measurement of multipath. The BER field provides a measurement of bit error rate.

Unit 14 calculates and stores the RxLQA value and provides the RxLQA value to unit 12 as the TxLQA value. Unit 12 stores the TxLQA value and provides an acknowledgement of the receipt of the TxLQA value to the unit 14. The acknowledgement indicates how well unit 12 received the TxLQA value.

Figure 5:
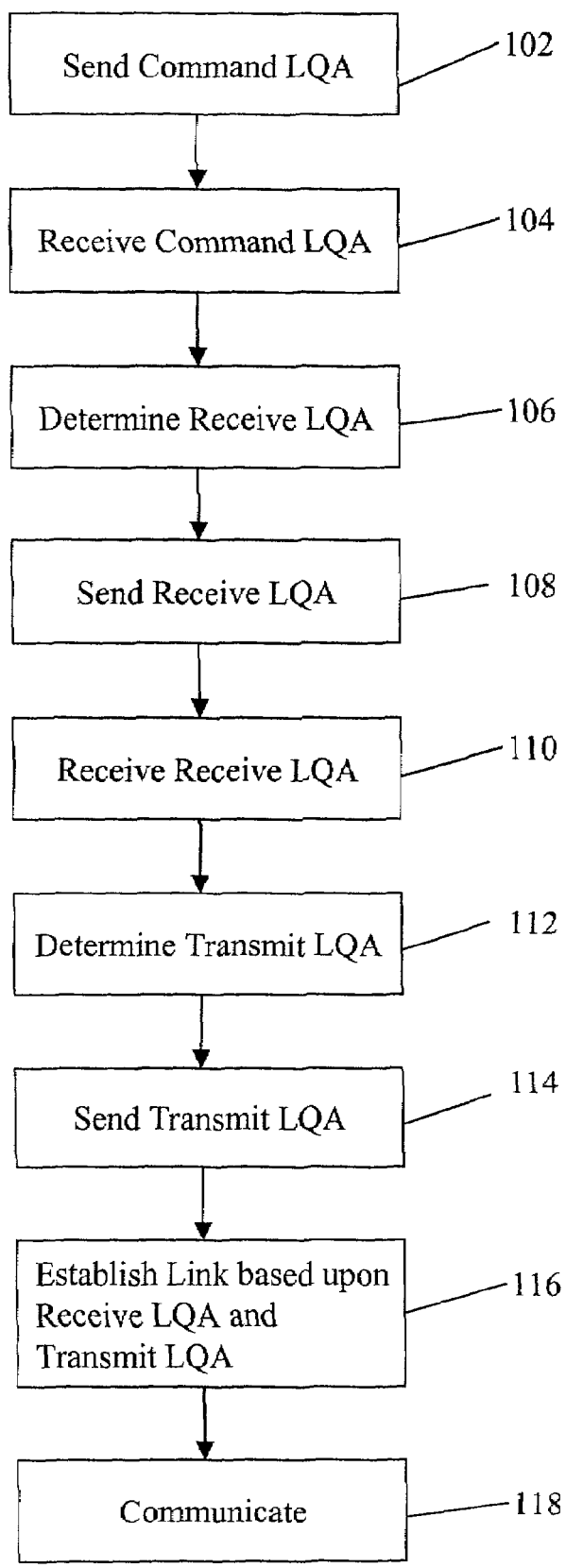
FIG. 5 is a flow diagram showing the linking operation illustrated in FIG. 4, in accordance with still another exemplary embodiment.

With reference to FIG. 5, at a step 102, unit 12 sends a command LQA signal to unit 14. At a step 104, unit 14 receives the command LQA signal. At a step 106, unit 14 determines the LQA parameter or the quality of the channel between units 12 and 14 based upon the command LQA signal. At a step 108, unit 14 sends receive LQA data to unit 12. At a step 110, unit 12 receives the receive LQA data. At a step 112, unit 12 determines transmit LQA data. At a step 114, unit 12 transmits the transmit LQA data. At a step 116, unit 14 establishes a link based upon the receive LQA data and transmit LQA data and communicates at a step 118.

It is understood that while the detailed drawings, specific examples, and particular values given provide a preferred exemplary embodiment of the present invention, it is for the purpose of illustration only. The method and apparatus of the invention is not limited to the precise details and conditions disclosed. Various changes may be made to the details disclosed without departing from the spirit of the invention which is defined by the following claims.

What is claimed is:

1. A STANAG 5066 communication system, comprising:
a first unit; and
a second unit, wherein the first unit provides a Link Quality Analysis (LQA) command to the second unit during initial linking, wherein the second unit records a first LQA value in response to the LQA command and transmits the first LQA value to the first unit, wherein the first unit records a second LQA value in response to the first LQA value and transmits the second LQA value to the second unit, wherein the first unit and the second unit communicate data at a data rate selected in response to the first LQA value and the second LQA value.

2. The STANAG 5066 communication system of claim 1 wherein the first unit and the second unit communicate data at an interleaving level selected in response to the first LQA value and the second LQA value.

3. The STANAG 5066 communications system of claim 2 wherein the first unit and the second unit are wireless units.

4. The STANAG 5066 communication system of claim 3 wherein the first unit and the second unit otherwise communicate according to STANAG 5066.

5. The STANAG 5066 communication system of claim 1 wherein the first LQA value indicates a quality of a channel between the first unit and the second unit.

6. The STANAG 5066 communication system of claim 5 wherein the LQA command includes a preamble, and a first character, the first character being comprised of seven bits.

7. A wireless communication unit operating according to a STANAG 5066 specification, the communication unit comprising:
   a receiver;
   a transmitter; and
   an initialization circuit, wherein the initialization circuit determines a data rate for at least one of the receiver and the transmitter, the initialization circuit selecting the data rate in response to a first Link Quality Analysis (LQA) value received by the receiver, the first LQA value being received during link initialization; and wherein, the first LQA value received by the receiver from another communication unit in response to a LQA command comprising a LQA value sent to said another communication unit during link initialization.

8. The communication unit of claim 7 wherein the initialization circuit determines an interleaving level.

9. The communication unit of claim 7 wherein the data rate is set according to an algorithm.

10. The communication unit of claim 9 wherein the algorithm includes a maximum data rate, a default rate and a minimum data rate and uses the first LQA value to choose the data rate between the maximum data rate and the minimum data rate.

11. The communication unit of claim 7 wherein the transmitter provides a command LQA value.

12. The communication unit of claim 7 wherein the data rate is greater than 300 bits per second.

13. A method of setting a data rate for a STANAG 5066 communication link, the method comprising:
   receiving a Link Quality Analysis (LQA) command signal during initialization;
   recording a first LQA command value in response to the LQA command signal during link initialization;
   transmitting a LQA command value signal related to the first LQA command value;
   receiving an acknowledgment of the first LQA command value signal and a second LQA command value; and
   setting the data rate in response to the acknowledgment, the first LQA command value and the second LQA command value.

14. The method of claim 13 wherein the quality command value signal and the acknowledgement include SINAD bits and BER bits.

15. The method of claim 13 wherein the quality command value signal and the acknowledgement include MP bits, SINAD bits and BER bits.

16. The method of claim 13 wherein the quality command signal is a wireless signal.

17. The method of claim 13 further comprising setting an interleaving parameter during link initialization.

18. The method of claim 17 wherein the interleaving parameter is set during link initialization.

19. The method of claim 13 wherein the quality command signal includes a 4 bit noise report, a 7 bit first character field, a 1 bit control field, a 3 bit Mp field, a 5 bit SINAD field, and a 5 fit BER field.

20. The method of claim 13 wherein the quality command signal is one FSK signal.

* * * * *